United States Patent [19]

Walendziak

[11] Patent Number: 5,257,169

[45] Date of Patent: Oct. 26, 1993

[54] BARBECUE GRILL LIGHTING APPARATUS

[76] Inventor: Richard W. Walendziak, 243 Lancaster St., West Boylston, Mass. 01583

[21] Appl. No.: 900,668

[22] Filed: Jun. 19, 1992

[51] Int. Cl.[5] ............................................. F21V 33/00
[52] U.S. Cl. ...................... 362/92; 362/154; 362/156; 362/191; 126/25 R; 126/213
[58] Field of Search ................. 362/92, 154, 155, 156, 362/191, 208, 190, 157; 126/25 R, 39 BA, 41 R, 213, 58

[56] References Cited

U.S. PATENT DOCUMENTS

| | | | |
|---|---|---|---|
| 2,644,882 | 7/1953 | Voda | 362/155 |
| 3,291,114 | 12/1966 | Metcalf | 126/25 R |
| 4,855,881 | 8/1989 | Pence | 362/154 |
| 4,989,579 | 2/1991 | Murphy et al. | 126/41 R |
| 5,143,440 | 9/1992 | Trampota | 362/154 |

Primary Examiner—James C. Yeung
Attorney, Agent, or Firm—Leon Gilden

[57] ABSTRACT

A lighting apparatus is arranged for fixed securement to an upper barbecue grill housing in adjacency and positioned below the handle, whereupon lifting of the upper housing relative to the lower housing of a barbecue grill structure, the illumination member directs illumination onto an underlying barbecue grill grate. The housing includes a generator and in operative communication with rechargeable batteries to effect selective illumination of illumination bulbs contained within the housing.

3 Claims, 4 Drawing Sheets

5,257,169

BARBECUE GRILL LIGHTING APPARATUS

BACKGROUND OF THE INVENTION

1. Field of the Invention

The field of invention relates to barbecue grill apparatus, and more particularly pertains to a new and improved barbecue grill lighting apparatus wherein the same is arranged to effect selective illumination of a cooking grill relative to a barbecue assembly.

2. Description of the Prior Art

Prior art U.S. Pat. No. 3,524,980 to Meloan sets forth a barbecue grill having a light assembly positioned above the barbecue grill. The Meloan structure is of a typically cumbersome and elaborate organization not suitable to the retrofit combination as utilized by the instant invention.

U.S. Pat. No. 4,754,376 to Winslow sets forth an automatic ice chest having an illumination member contained therewithin operative upon opening of the ice chest structure.

Accordingly, it may be appreciated there continues to be a need for a new and improved barbecue grill lighting apparatus as set forth by the instant invention which addresses both the problems of ease of use as well as effectiveness in construction in directing a compact, self-contained illumination housing arranged for operative association relative to the barbecue grill assembly and in this respect, the present invention substantially fulfills this need.

SUMMARY OF THE INVENTION

In view of the foregoing disadvantages inherent in the known types of barbeque grill apparatus now present in the prior art, the present invention provides a barbecue grill lighting apparatus wherein the same is directed to selective illumination of an underlying grate of a barbecue grill. As such, the general purpose of the present invention, which will be described subsequently in greater detail, is to provide a new and improved barbeque grill lighting apparatus which has all the advantages of the prior art barbeque grill apparatus and none of the disadvantages.

To attain this, the present invention provides a lighting apparatus arranged for fixed securement to an upper barbeque grill housing in adjacency and positioned below the handle, whereupon lifting of the upper housing relative to the lower housing of a barbecue grill structure, the illumination member directs illumination onto an underlying barbeque grill grate. The housing includes a generator and in operative communication with rechargeable batteries to effect selective illumination of illumination bulbs contained within the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barbeque grill lighting apparatus which has all the advantages of the prior art barbecue grill apparatus and none of the disadvantages.

It is another object of the present invention to provide a new and improved barbecue grill lighting apparatus which may be easily and efficiently manufactured and marketed.

It is a further object of the present invention to provide a new and improved barbecue grill lighting apparatus which is of a durable and reliable construction.

An even further object of the present invention is to provide a new and improved barbecue grill lighting apparatus which is susceptible of a low cost of manufacture with regard to both materials and labor, and which accordingly is then susceptible of low prices of sale to the consuming public, thereby making such barbecue grill lighting apparatus economically available to the buying public.

Still yet another object of the present invention is to provide a new and improved barbecue grill lighting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
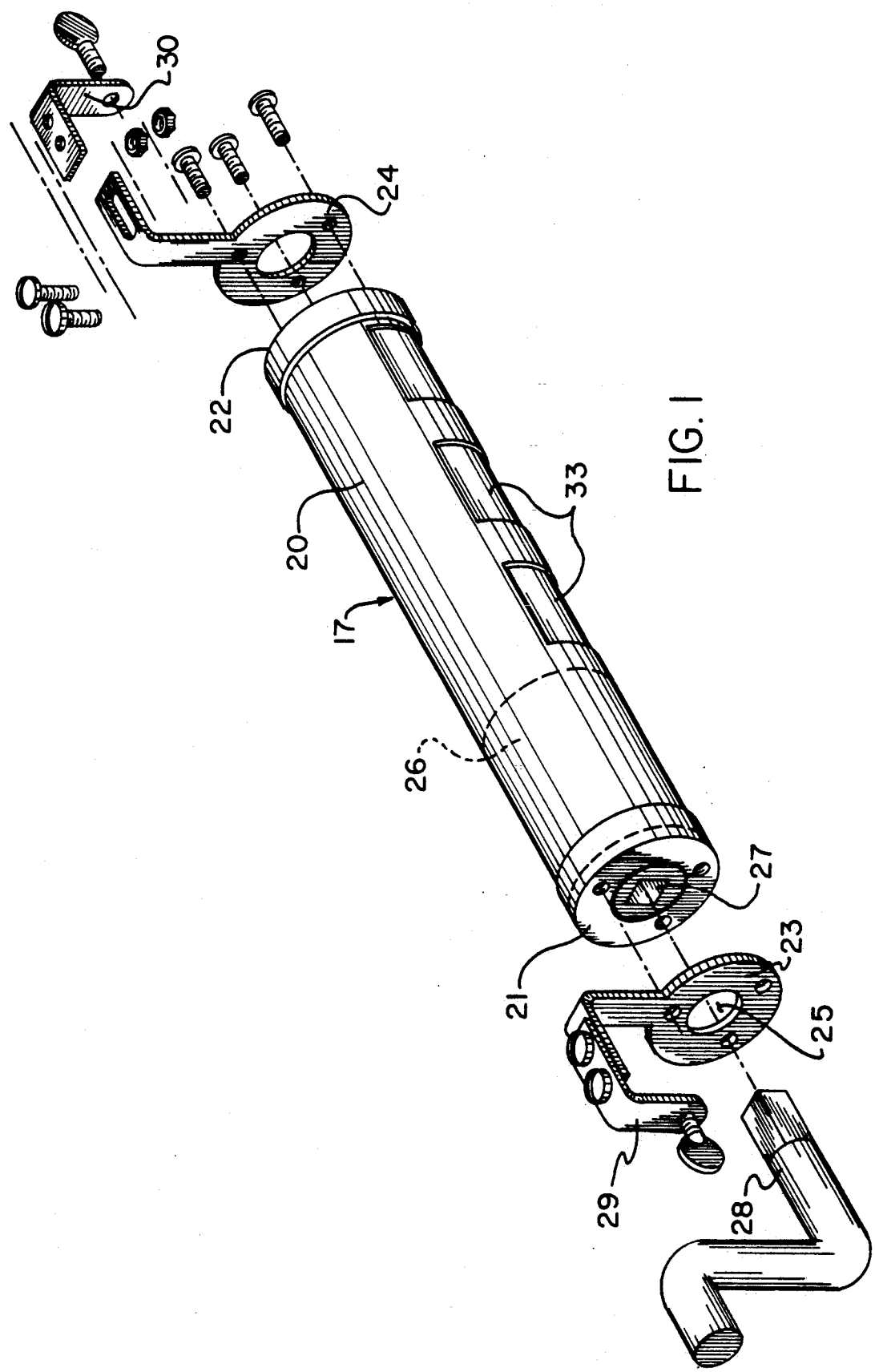
FIG. 1 is an isometric illustration, partially exploded view, of the illumination housing of the invention.
Figure 2:
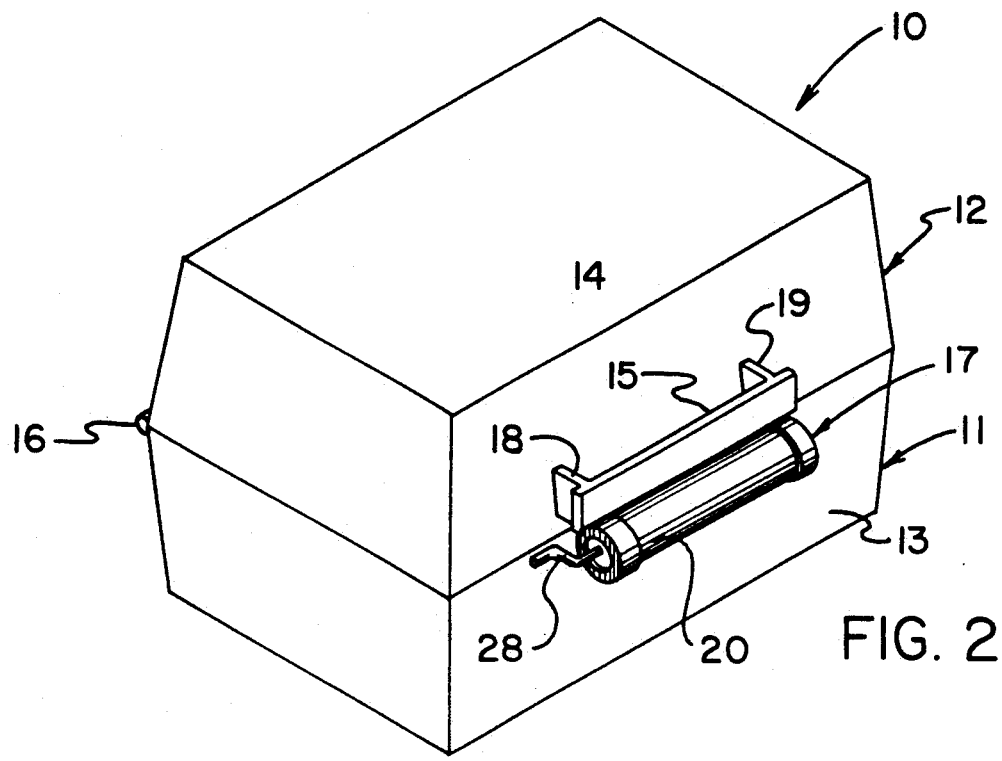
FIG. 2 is an isometric illustration of the invention in a similar configuration.

With reference now to the drawings, and in particular to FIGS. 1 to 6 thereof, a new and improved barbecue grill lighting apparatus embodying the principles and concepts of the present invention and generally designated by the reference numeral 10 will be described.

More specifically, the barbecue grill lighting apparatus 10 of the instant invention essentially comprises a barbecue grill lower housing 11 pivotally mounted relative to a barbecue grill upper housing 12 about a grill hinge 16. The lower housing includes a lower housing front wall 13 positioned in adjacency relative to an upper housing front wall 14. The upper housing front wall includes a handle 15 mounted thereto arranged in a spaced relationship relative to the upper housing front wall 14 by first and second handle flanges 18 and 19 arranged in a parallel relationship relative to one another and spaced apart a predetermined spacing.

The illumination housing 17 of the invention includes a cylindrical housing 20 having a first end wall 21 spaced from a second end wall 22. A first end wall plate 23 and second end wall plate 24 are mounted to the respective first and second end walls 21 and 22. The first end wall plate 23 includes an end wall plate aperture 25 coaxially aligned with a direct current generator socket 27 of a direct current generator 26 positioned within the illumination housing 17 coaxially aligned within the housing and positioned in adjacency relative to the first end wall 21. A crank cable 28 is directed through the end wall plate aperture 25 into the direct current generator socket 27.

A first securement flange 29 arranged in a parallel spaced relationship relative to the first end wall plate 23 and a second securement flange 30 arranged in a parallel spaced relationship relative to the second end wall plate 24 are fixedly positioned relative to the respective first and second end wall plates 23 and 24. A first fastener 31 orthogonally directed through the first securement flange 29 is oriented to capture the first handle flange 18 between the first end wall plate 23 and the first securement flange 29. Similarly, the second fastener 32 threadedly directed through the second securement flange 30 captures the second handle flange 19 positioned between the second end wall plate 24 and the second securement flange 30.

Figure 3:
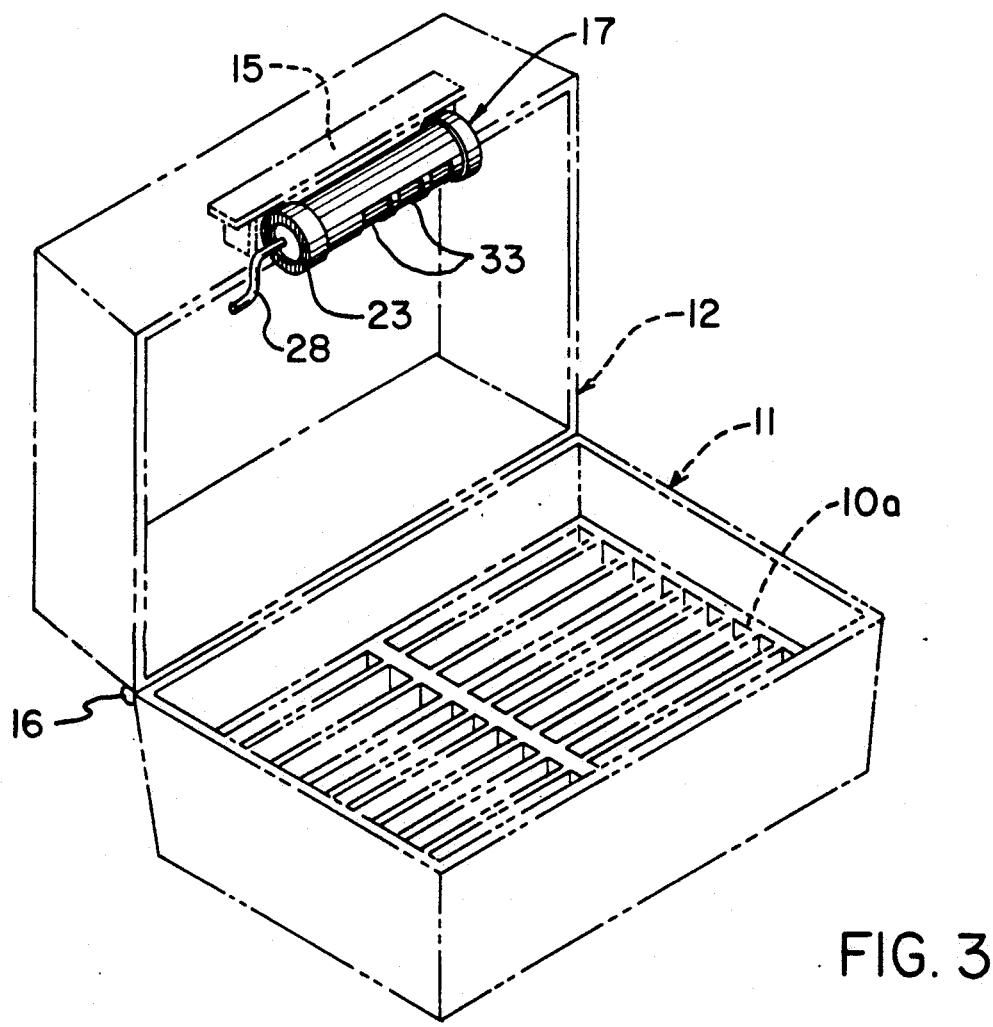
FIG. 3 is an isometric illustration of the barbecue grill in an opened configuration orienting the illumination windows of the illumination housing onto the underlying grate.
Figure 4:
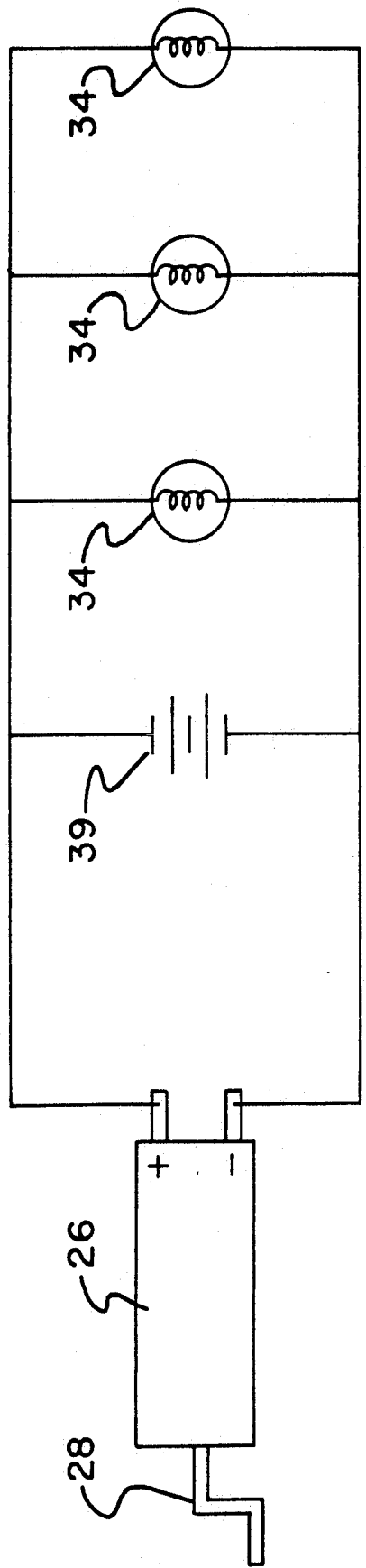
FIG. 4 is a diagrammatic electrical circuit utilized by the invention.
Figure 5:
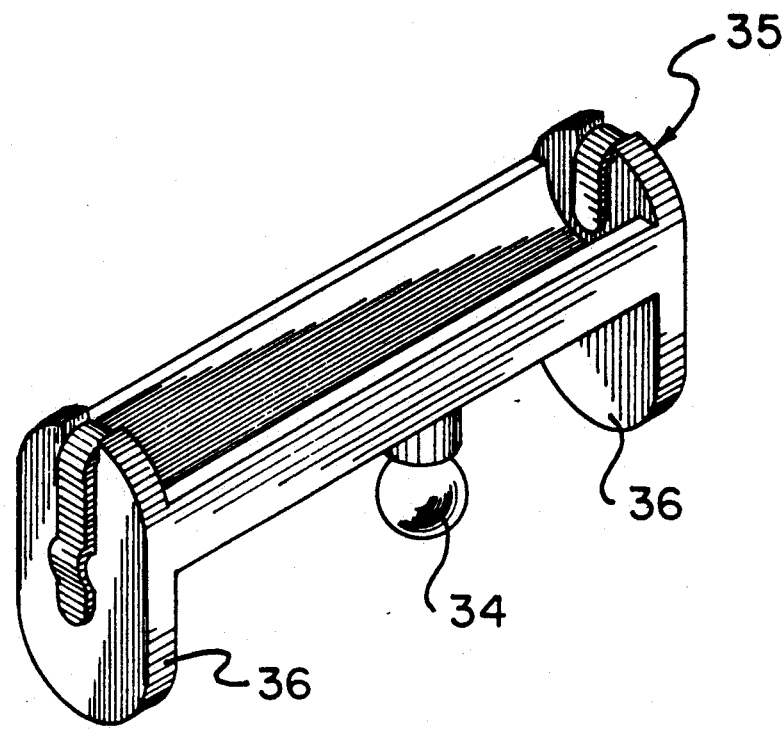
FIG. 5 is an isometric illustration of the illumination bulb carrier utilized by the invention.
Figure 6:
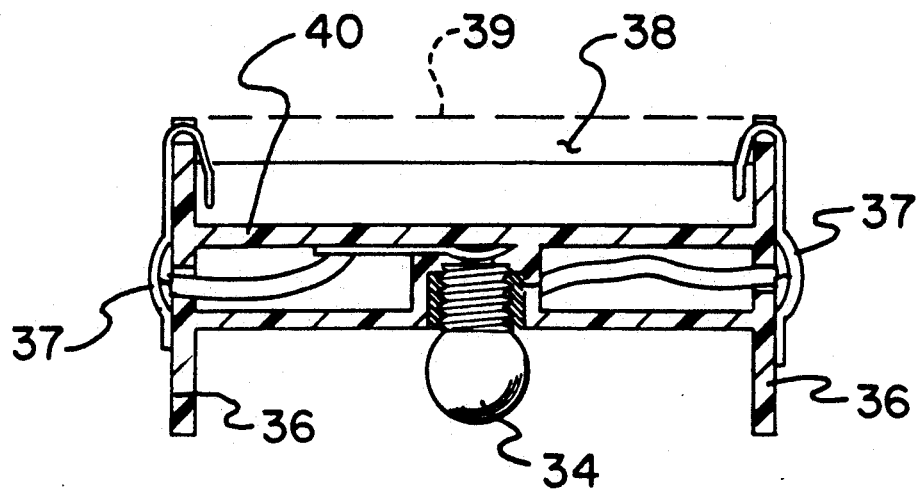
FIG. 6 is an orthographic cross-sectional illustration of the illumination bulb carrier of the invention.

At least one, and preferably a plurality of, illumination windows 33 are directed into the illumination housing 17 oriented below the upper housing front wall 14 and displaced relative to the upper housing front wall 14, whereupon lifting of the upper housing 12 relative to the lower housing 11, the illumination windows 33 are oriented above the barbecue grill grate 10a, as illustrated in the FIG. 3.

At least one illumination bulb 34 is positioned in adjacency relative to each window 33 mounted within an illumination bulb carrier 35. The carrier 35 includes a plurality of spaced parallel flanges 36, each having a contact plate 37 to provide for electrical communication between the illumination bulbs 34, in a manner as directed in the schematic illustration of FIG. 4. A carrier socket 38 positioned between the carrier flanges 36 and above the illumination bulb 34 mounts a battery 39 typically of a rechargeable type that is recharged in utilization of the direct current generator 26. The illumination bulb carrier 35 further includes a carrier central web 40 mounting an illumination bulb 34 below the central web 40 and the battery 39 thereabove for a compact, unitary organization arranged for mounting within the illumination housing 17.

In use, the crank handle 28 is merely rotated to effect illumination of the bulbs 34 and upon lifting of the upper housing 12 relative to the lower housing 11, illumination is directed upon the underlying grate 10a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barbecue grill lighting apparatus, comprising,
   a barbecue grill including a lower housing and an upper housing, the upper housing and lower housing include an intercommunicating hinge member to pivotally mount the upper housing relative to the lower housing, and
   the lower housing including a barbecue grill grate positioned therewithin below the upper housing, and
   the upper housing including an upper housing front wall, the lower housing including a lower housing front wall, the upper housing front wall including a handle, and
   a first handle flange and a second handle flange fixedly mounted to the upper housing front wall in a spaced relationship, with the handle secured to the first handle flange and the second handle flange spaced relative to the upper housing front wall, and
   an illumination housing mounted to the first handle flange and the second handle flange below the handle, and illumination means mounted within the illumination housing for effecting selective illumination from within the illumination housing, and
   the illumination housing includes a cylindrical housing, the cylindrical housing including a first end wall spaced from and parallel a second end wall, and the first end wall plate mounted to the first end wall, a second end wall plate mounted to the second end wall, the first end wall plate including an end wall plate aperture directed therethrough, and the first end wall including a direct current generator socket directed through the first end wall, and a direct current generator mounted within the cylindrical housing in adjacency to the first end wall having the direct current generator socket directed therewithin, and a crank handle directed through the wall plate aperture into the direct current generator socket.

2. An apparatus as set forth in claim 1 including a first securement flange arranged in a parallel spaced relationship to the first end wall plate fixedly mounted to the first end wall plate, and a second securement flange arranged in a parallel spaced relationship relative to the second end wall plate fixedly mounted to the second end wall plate, and a first fastener directed orthogonally through the first securement flange and the second fastener directed orthogonally through the second securement flange, and the first handle flange positioned between the first end wall plate and the first securement flange engaged by the first fastener, and the second handle flange positioned between the second end wall plate and the second securement flange engaged by the second fastener.

3. An apparatus as set forth in claim 2 wherein the illumination means includes at least one illumination window directed through the cylindrical housing oriented below the upper housing front wall, and at least one illumination bulb carrier positioned within the cylindrical housing in adjacency to the at least one window, the illumination bulb carrier including spaced parallel flanges, and a carrier central web orthogonally directed between the carrier flanges, and an illumination bulb mounted to the central web below the central web, and a rechargeable battery positioning the carrier flanges above the central web, with the battery and the illumination bulb in electrical communication with the direct current generator.

* * * * *